US005923406A

United States Patent [19]

Brasington et al.

[11] Patent Number: 5,923,406

[45] Date of Patent: Jul. 13, 1999

[54] PERSONAL POSTAGE STAMP VENDING MACHINE

[75] Inventors: Glynn M. Brasington, Yokohama, Japan; Leon A. Pintsov, West Hartford; Steven J. Shapiro, Monroe, both of Conn.

[73] Assignee: Pitney Bowes Inc., Stamford, Conn.

[21] Appl. No.: 08/884,212

[22] Filed: Jun. 27, 1997

[51] Int. Cl.[6] .......... G03B 27/52; G03B 27/32

[52] U.S. Cl. .......... 355/40; 355/27

[58] Field of Search .......... 355/27, 40; 348/598, 348/373; 364/400, 401; 352/204; 283/71

[56] References Cited

U.S. PATENT DOCUMENTS

| | | | |
|---|---|---|---|
| 5,091,713 | 2/1992 | Horne et al. | 340/541 |
| 5,296,945 | 3/1994 | Nishikawa et al. | 358/518 |
| 5,343,386 | 8/1994 | Barber | 364/400 |
| 5,345,313 | 9/1994 | Blank | 348/598 |
| 5,467,709 | 11/1995 | Salomon | 101/93 |
| 5,587,740 | 12/1996 | Brennan | 348/373 |
| 5,873,605 | 2/1999 | Kaplan | 283/71 |

*Primary Examiner*—Safet Metjahic
*Assistant Examiner*—Hung Henry Nguyen
*Attorney, Agent, or Firm*—Steven J. Shapiro; Melvin J. Scolnick

[57] ABSTRACT

A vending machine system for printing postage stamps, the vending machine system includes an enclosed housing having a front panel with an aperture therein; a camera, mounted in the housing, for receiving through the aperture an image of at least one person and for creating an electronic image of the at least one person based on the received image of the at least one person; a printer; a payment receiving device for accepting payment and for providing a payment signal indicative that payment has been made; a computer including a memory, the computer 1) causing the camera to create the electronic image of the at least one person upon receipt of the payment signal, 2) saving the electronic image of the at least one person in the memory, and 3) utilizing the electronic image of the at least one person for controlling the printer to print a first personalized postage stamp on a recording medium, the first personalized postage stamp including predetermined data required by a postal authority and a picture of the at least one person based on the stored electronic image.

6 Claims, 6 Drawing Sheets

PERSONAL POSTAGE STAMP VENDING MACHINE

BACKGROUND

The present invention relates to vending machines and, in particular, to vending machines providing personalized postage stamps.

It is a common practice throughout the world to use postage stamps as an indication that postage has been paid for the delivery of a mailpiece. These postage stamps are typically produced and issued by a government agency and procured for use by the general public. The postage stamps can either be obtained at a local post office or can be procured out of a postal vending machine. Moreover, for certain holidays or for certain special events the postal authority often produces a limited number of special edition or commemorative stamps which are distributed for sale and used for the payment of postage or alternatively are saved as a collector's item. These commemorative/special edition stamps are quite popular and generate a significant amount of postal revenue.

Despite the fact that commemorative/special edition stamps are known, personalized postage stamps are not available. That is, it would be desirable to permit a consumer to obtain a postage stamp which can be personally customized in appearance by the consumer. This type of personalized stamp would likely be well received by the general public and a premium could be charged for such a stamp to create additional revenue for the postal service.

A particular form of personalizing a postage stamp which has heretofore never been accomplished would be to provide a postage stamp which included a picture of the individual sending the mailpiece. The postage stamp including the individual's picture could be created at any one of a plurality of independent kiosk/vending machines as will be discussed in more detail in connection with the invention described herein. Thus, the inventive concept set forth in this application provides for the creation of personalized postage stamps anywhere a kiosk/vending machine is installed. The kiosk/vending machine would have a digital camera incorporated therein to take the individual's picture so that the digital image can be combined with a standard postage stamp image thereby creating the personalized postage stamp. One problem in connection with this type of personalized stamp is that the photo which is taken must produce a good image of the individual or else consumers will quickly become dissatisfied if they have to pay for a poor quality image. Potential solutions to this problem are discussed in connection with the preferred embodiment of the invention.

It is also desirable to provide as part of the printed personalized postage stamp additional information about the contents of the envelope. That is, it would be desirable to provide a mechanism in the personalized postage stamp itself which would, at a subliminal level, indicate to the user the nature of the contents of the mailpiece. For example, it would be desirable for the postage stamp to provide an indication as to whether the contents of the envelope were of a serious nature (i.e. business related), a happy nature (invitation, birth announcement), or of a very sad nature (death notice, bill).

SUMMARY OF THE INVENTION

An object of the invention is to provide a vending machine system capable of printing personalized postage stamps including a picture of an individual. This object is met by providing a vending machine system for printing postage stamps, the vending machine system includes an enclosed housing having a front panel with an aperture therein; a camera, mounted in the housing, for receiving through the aperture an image of at least one person and for creating an electronic image of the at least one person based on the received image of the at least one person; a printer; a payment receiving device for accepting payment and for providing a payment signal indicative that payment has been made; a computer including a memory, the computer 1) causing the camera to create the electronic image of the at least one person upon receipt of the payment signal, 2) saving the electronic image of the at least one person in the memory, and 3) utilizing the electronic image of the at least one person for controlling the printer to print a first personalized postage stamp on a recording medium, the first personalized postage stamp including predetermined data required by a postal authority and a picture of the at least one person based on the stored electronic image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the application, illustrate a presently preferred embodiment of the invention, and together with the general description given above and the detailed description of the preferred embodiment given below, serve to explain the principals of the invention.

DETAILED DESCRIPTION OF THE PREFERRED EMBODIMENTS

Figure 1:
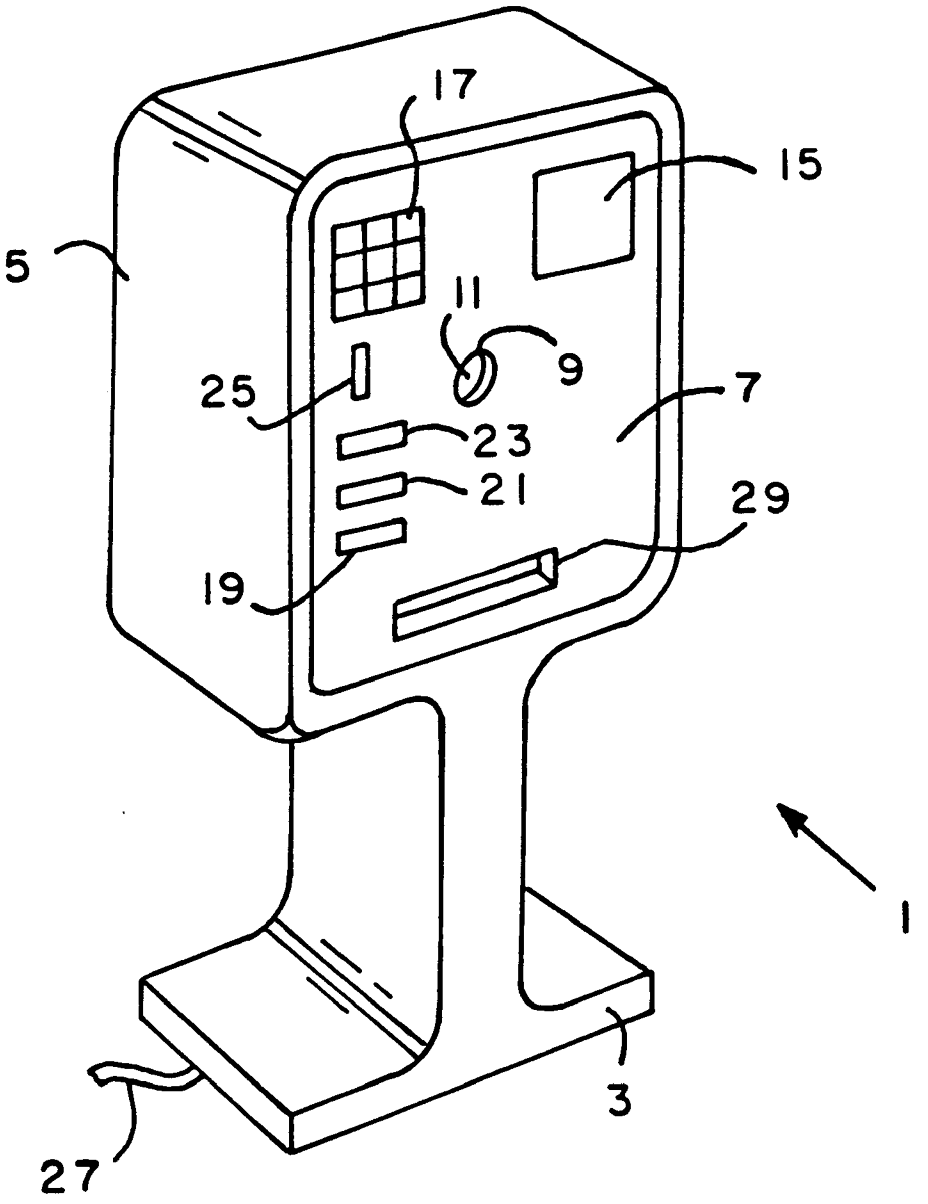
FIG. 1 is a perspective view of the inventive personal postage stamp vending machine.

FIG. 1 shows a vending machine 1 which is capable of printing personalized postage stamps 2 (as shown for example in FIGS. 5, 6, 7, 8 and 9). Vending machine 1 can be located anywhere such as in convenience stores, malls, etc. so that any consumer can simply walk up to the vending machine 1 to obtain one or a plurality of personalized postage stamps 2. Vending machine 1 includes a base portion 3 which supports an upper enclosed portion 5 within which all of the operating components of vending machine 1 are securely housed. Vending machine 1, although not shown, can itself be disposed in a conventional photo booth for the purpose of creating a quality photographic environment. Such photo booths are commonly known in the art and no further detailed discussion is considered warranted for the purpose of understanding the claimed invention. Vending machine 1 includes a front panel 7 having an aperture 9 therein behind which the lens 11 of a digital camera 13 (see FIG. 2) is disposed. Front panel 7 also includes a display 15 via which information is conveyed to a user of vending machine 1 and also in which the digitally created image made by camera 13 can be displayed.

A user of vending machine 1 provides input concerning the desired personalized postage stamp 2 via a keyboard 17. Moreover, in a preferred embodiment, the vending machine 1 includes a smart card reader 19, a magnetic strip card reader 21, a paper money reader 23 and a coin accounting device 25. Smart card reader 19, magnetic strip card reader 21, paper money reader 23, and coin accounting device 25 are conventionally known structures and the function of each in connection with the inventive vending machine is discussed hereinbelow in connection with FIG. 2. Additionally, vending machine 1 includes a telephone/power line 27 which functions to provide power to the vending machine 1 and to permit vending machine 1 to communicate with external devices as discussed in more detail below. Furthermore, slot 29 is also provided in front panel 7 to receive mailpieces therein.

Figure 2:
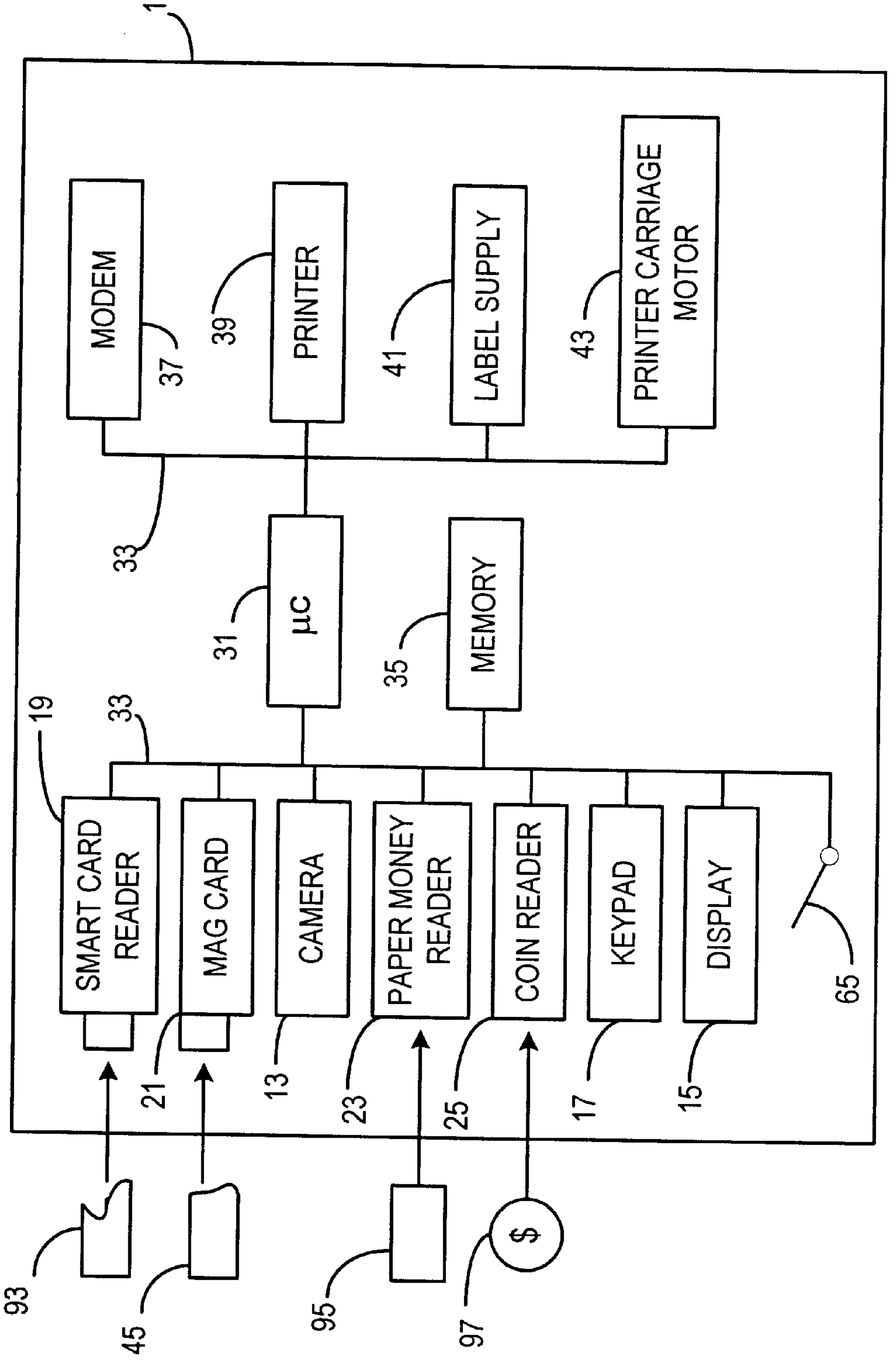
FIG. 2 is a schematic block diagram of the electronic architecture of the vending machine of FIG. 1.

Referring to FIG. 2, the operation of vending machine 1 is controlled by a microprocessor 31. Microprocessor 31 is electronically connected via a bus 33 to smart card reader 19, magnetic strip card reader 21, camera 13, paper money reader 23, coin accounting device 25, keypad 17, and display 15. Additionally, microprocessor 31 is connected via bus 33 to a memory device 35 which has stored therein all of the programs required for operation of vending machine 1. Microprocessor 31 also communicates with a modem 37, a printer 39, a label supply spool 41 and a printer carriage motor 43.

In operation, a consumer presses a designated one of the individual buttons on keypad 17 to commence a transaction for printing a desired quantity of personalized postage stamps 2. Microcontroller 31 then displays information back to the user via display 15, such as providing a menu of personal postage stamp options or requesting which type of payment the consumer will be using to pay for the personal postage stamps to be printed. Responses to the inquiry from microcontroller 31 will be given by the consumer via the keyboard 17. Thus, for example, if the consumer wishes to pay for the personalized postage stamp 2 utilizing a conventional magnetic strip credit card 45, and such an indication is provided to the microcontroller 31, the microcontroller 31 advises the user via the display 15 to insert the credit card into the magnetic strip card reader 21. Upon insertion of the magnetic strip card 45 into the reader 21, the microprocessor 31 receives the identifying account information encoded in the magnetic strip card 45 and, via modem 37, either connects directly to a credit card data center 47 (as shown by the dotted line in FIG. 4) or alternatively communicates with the credit card data center 47 via a postage transaction data center 49. In either situation, the credit card data center 47 either verifies that the transaction is acceptable (i.e. credit card is valid) or sends a signal back to the microprocessor 31 denying use of the credit card. In the event that use is denied microprocessor 31 will send a message on display 15 advising the user that the transaction cannot be completed. In the event however, that the credit card check is satisfactory, the microcomputer 31 then requests the user to enter via the keyboard 17 the desired postage transaction. The user can then identify that they wish to have one or a plurality of personalized postage stamps 2 printed and enter such information via the keyboard 17. The microprocessor 31 will then control the display 15 to advise the consumer to position themselves in front of the lens 11 as is conventionally done in a photo booth by providing an adjustable seat so that the individuals eyes are approximately level with the lens 11. Once positioned, the digital camera 13 will take one or a plurality of pictures of the individual and will digitize the image(s) of the individual in a bit map format and store the digital image(s) in memory 35. Microcontroller 31 will then utilize the stored images in memory 35 and display to the consumer each of the different pictures taken via the display 15. The user can then select the picture which he likes best by entering a number associated with each of the displayed pictures via the keyboard 17. Once the user has selected the picture(s) which they prefer, the microprocessor 31 takes the selected digital image from memory 35 and drives a color ink jet printer 39 to produce the desired number of individual personalized postage stamps 2 on individual labels supplied by label supply reel 41 or alternatively, on a mailpiece which has been inserted into mailpiece slot 29.

Figure 3:
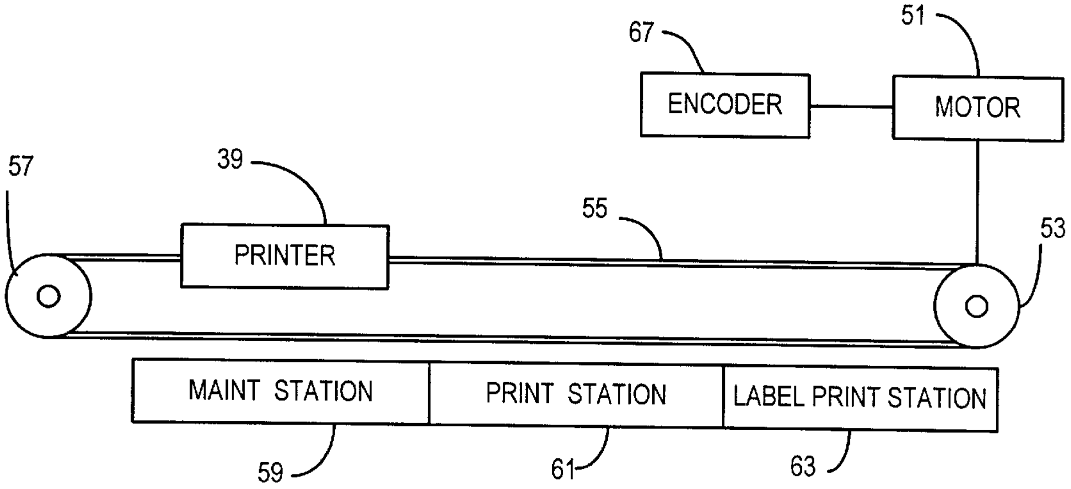
FIG. 3 schematically shows the structure for moving the printer of the vending machine of FIG. 1 between various print and maintenance stations.

Referring to FIG. 3, the structure for moving ink jet printer 39 within top portion 5 of vending machine 1 in order to print on the various recording medium is schematically shown. That is, a motor 51 is connected to a driven pulley 53. A continuous belt 55 is disposed around the driven pulley 53 and an idler pulley 57. The printer 39 is fixedly connected to the belt 55. Accordingly, when motor 51 is energized by microcontroller 31 to drive pulley 53, the printer 39 moves in a reciprocating manner between a conventional maintenance station 59 where printhead maintenance is accomplished and a mailpiece print station 61 and a label print station 63. Since the motor 51 is a bidirectional motor, reciprocating movement can be accomplished. The above structure for moving the printhead between the various stations is commonly known in the art and is shown, for example, in U.S. Pat. No. 5,467,709. Thus, as previously discussed, if a mailpiece is inserted into mail slot 29 the end of the inserted mailpiece will contact a switch 65 which in turn provides a signal to the microprocessor 31 which is indicative that the medium to be printed on is the inserted mailpiece. Microcontroller 31, in a conventional manner, controls the firing of the individual nozzles of the ink jet printer 39 relative to the movement of the printer 39 between the maintenance station 59, the mailpiece print station 61 and the label print station 63, based on a position input received from an encoder 67 operatively connected to the motor 51. The signals from the encoder 67 permit the microcontroller 31 to know the exact position of the printer 39. Thus, when the switch 65 indicates that the selected number of personalized postage stamps 2 should be printed on the mailpiece, the printer 39 will begin printing on the mailpiece when it is moving across the letter print station 61. Alternatively, if no mailpiece has been inserted into the slot 29 such that a signal is not received by the microcontroller 31 from the switch 65, the microcontroller 31 automatically assumes that individual personalized stamps 2 should be printed on individual labels which are provided from a label supply spool 41. The label supply spool 41 is operated in a conventional manner by a motor (not shown) to provide either gummed labels or adhesive backed labels to the label print station 63 in order for the printer 39 to print the personalized postage stamps 2 thereon. A representative example of a label supply spool is shown in U.S. Pat. No. 5,390,594 which is hereby incorporated by reference. The motor (not shown) associated with the label supply spool 41 is controlled by the microprocessor 31. It should thus be readily apparent from the description given above to one possessing ordinary skill in the art that the microcontroller 31 controls the firing of the inkjet printer 39 to print any number of personalized postage stamps 2 on either an inserted mailpiece or on individual labels provided by the label supply spool 41.

Figure 5:
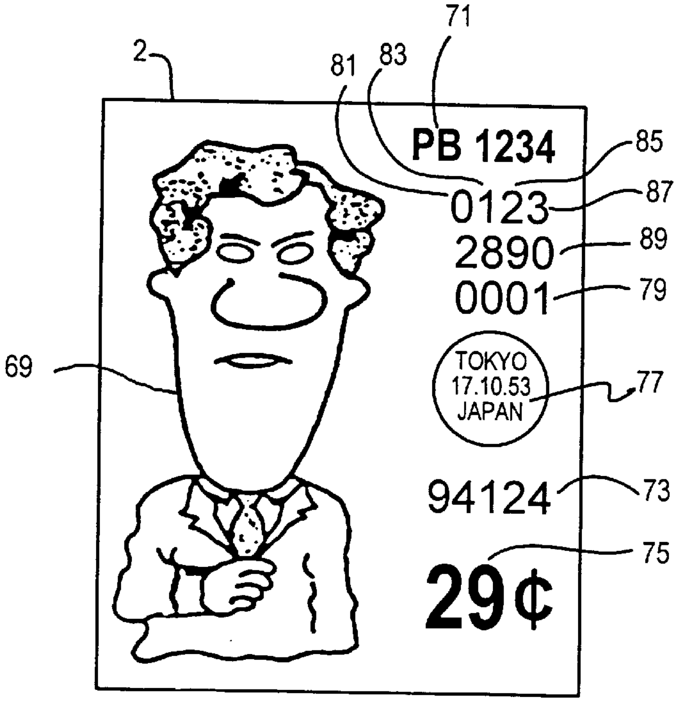
FIG. 5 shows a postage stamp produced by the instant inventive vending machine.

The personalized postage stamp 2 is shown in FIG. 5. The inkjet printer 39 under the control of the microcontroller 31, prints an image 69 of the consumer which was taken by the digital camera 13 and selected by the consumer as discussed above. The image 69 is printed in conjunction with other conventional postage stamp data required by the postal authority to create the personalized postage stamp 2. The other information included in the postage stamp includes a vendor/kiosk machine number 71, a post office identifying number 73, an amount of postage 75, and a date and place of origin circle 77. Additionally, the personalized postage stamp 2 includes a piece count 79 can be included on the stamp to identify how many stamps have been issued by the vending machine 1, a vendor identification number 81 to identify the manufacturer of the vending machine 1 and encrypted vendor and digital tokens 83, 85. Moreover, in order to ensure that the printed information has been correctly printed a number of check digits 87, 89 can also be printed as part of the indicia. The postal and vendor tokens 85, 83 are used as a means for verifying the authenticity of the printed personalized postage stamp 2 to provide the postal authority with the capability of detecting fraudulently produced stamps. The use of such tokens in a postage metering environment is known within the art such that a detailed discussion is not considered warranted. However, it is important to note that the tokens 83, 85 are produced at least partially based on certain information contained within the personalized postage stamp 2 including the piece count 79 and the vending machine serial number 71 such that each printed personalized postage stamp 2 will have a unique set of tokens associated therewith. The programming, algorithms and keys for generating the digital tokens 83, 85 are stored in memory 35. Additionally the postage stamp image generation engine is included as part of the microprocessor 31. Details of the image generation engine are described in copending application Ser. No. 08/554,179 entitled MAIL HANDLING APPARATUS AND PROCESS FOR PRINTING AN IMAGE COLUMN-BY-COLUMN IN REAL TIME and file Nov. 6, 1995 and which is hereby incorporated by reference.

Figure 4:
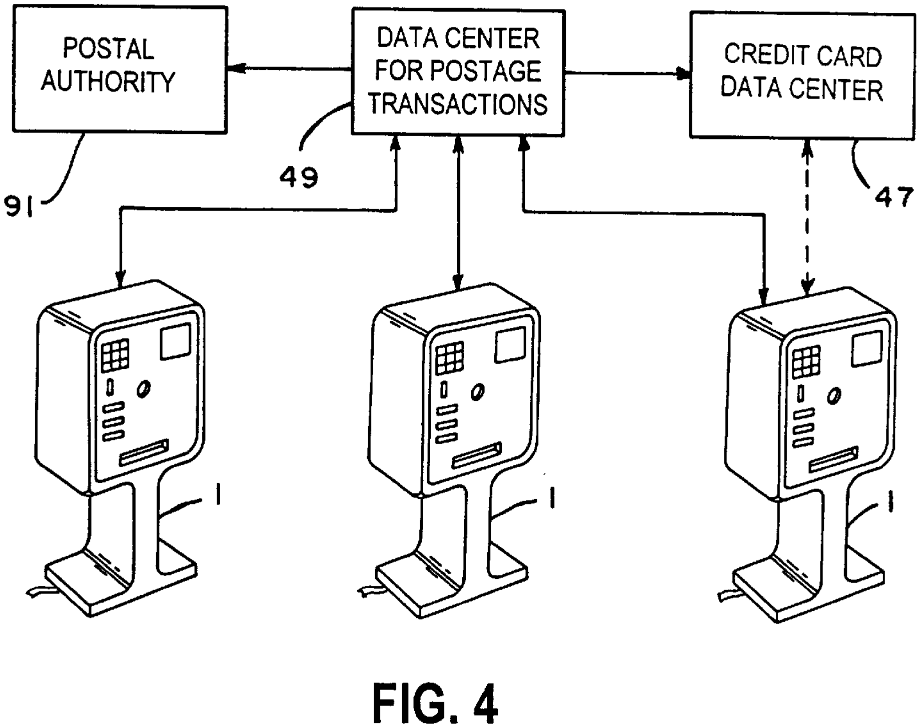
FIG. 4 schematically shows a system for remotely operating a plurality of inventive vending machines.

FIG. 4 shows a system to ensure that all of the funds collected by individual vending machines 1 are collected by the postal authority. That is, each individual vending machine 1 is operatively connected to the postage transaction data center 49 via its modem 37. Accordingly, when each individual personal postage stamp transaction takes place in a vending machine 1 the status of that transaction is stored in memory 35. For example, the number of personalized postage stamps 2 printed and the dollar value associated with each of those stamps for each transaction can be stored in memory 35. Alternatively, a running total of the number of postage stamps 2 printed and the total dollar value associated with that total number can be stored in memory 35. The data center 49 can, for example, on a nightly basis poll each of the individual vending machines 1 to obtain the total number of stamps 2 printed and the associated postage associated with those stamps for that specific day. The owners of the individual vending machines 1 would have prepaid accounts set up at the data center 49 such that a predetermined percentage of the revenue taken in by each of the vending machines 1 is automatically deducted from the individual accounts at the data center 49 and sent electronically to the postal authority 91. Once the daily upload of data from each of the vending machines 1 to the data center 49 has been accomplished, the registers in memory 35 of each individual vending machine 1 can be reset to zero.

In an alternative embodiment, each of the vending machines 1 can have stored in memory 35 a conventional postage accounting module. The postage accounting module is capable of having downloaded therein in a conventional manner from data center 49 a predetermined amount of postage. Thus, an owner of the vending machine 1 prepays an account at the data center 49 and then requests that the predetermined amount of postage funds be downloaded into the accounting module of the vending machine 1. This capability provides some type of control over misuse of the vending machine 1 in that once the downloaded amount of postage funds has been exhausted, the further printing of additional personalized postage stamps 2 is precluded. In operation, the vending machine 1 for each user transaction determines if sufficient funds are available in the accounting module to complete the printing of the desired number of personalized postage stamps 2 at the desired value. If sufficient funds are available, microprocessor 31 decrements the amount of postage to be dispensed from a descending register of the accounting module, adds the amount to an ascending register of the accounting module, and permits printing of the desired number of personalized postage stamps 2. The accounting module therefore manages the amount of funds within the vending machine 1 with the ascending register representing the lifetime amount of postage funds spent, the descending register representing the amount of funds currently available, and a control sum register showing the running total amount of funds which have been credited to the vault from the data center 49. In this embodiment, microprocessor 31 can still, on a daily basis, upload to the data center 49 the daily transaction associated with the issuing of personalized postage stamps 2. Moreover, memory 35 can have programming installed therein that disables operation of vending machine 1 in the event that vending machine 1 does not on a daily basis interface with the data center 49 to provide the daily accounting data. Furthermore, data center 49 during the daily accounting transaction process can query the individual registers of the vending machine 1 thereby accomplishing a remote inspection to determine if any tampering of the registers has occurred.

Returning to FIG. 2, a smart card 93 can be used in lieu of the magnetic strip credit card 45 for payment purposes. Smart card 93, as known in the art, has an embedded microprocessor and associated memory therein which, when placed in smart card reader 19, communicates with microprocessor 31 via bus 33. Smart card 93 has stored in a portion of its memory prepaid postage funds. These smart cards 93 would be purchased from the postal authority. When they are inserted into the smart card reader 19, microprocessor 31 queries the smart card 93 to determine if it has enough funds to pay for the desired amount of personalized postage stamps 2 being procured. If the answer is yes, the transaction is completed as discussed above in connection with the magnetic strip card 45 except that the funds in the smart card 93 are decremented by the postage amount and no postal accounting at data center 49 occurs.

Moreover, memory 35 can be partitioned such that accounting data for smart card 93 transactions are kept separate from the magnetic strip card 45 transactions and any money payment transactions to be discussed below. Thus, even though the postal authority has already received its postage payment when the smart card 93 was procured, the storage of smart card 93 usage data permits accountability for all personalized postage stamps 2 printed by each vending machine 1 and also provides a vehicle for the postal authority to track the use of each smart card 93. That is, each smart card 93 is given a unique serial number which is provided to microprocessor 31 during each transaction. This information is then provided to the postal authority via communication with data center 49 as previously discussed.

A third alternative for payment is that each vending machine 1 will accept paper money which is put into paper money reader 23 and coins 97 which are put into coin accounting device 97. Upon the deposit of the required funds, the printing of personalized postage stamps 2 and the accounting between the vending machine 1 and the data center 49 is the same as discussed above in connection with the magnetic strip card 45. Thus, in the preferred embodiment, three methods of payment for the personalized postage stamps are possible. However, vending machines 1 can also be implemented with only some of the payment capabilities discussed above.

In yet another embodiment, the processing/memory capabilities of the smart card 93 can be effectively utilized to store digitally created photographic images of individuals which can then be downloaded into memory 35 of vending machine 1 and printed out as part of the personalized postage stamp 2. This provides consumers with a great deal of flexibility in that if they have a particularly good picture taken it can be stored and used over and over again. Moreover, the picture taken in the picture booth is typically limited to a photo of the person's head and upper body. Use of the smart card will permit full body images to be printed as well as complete family photos. Additionally a plurality of digital images can be stored on the smart card 93 such as for each member of a family or even a complete family photo. Thus, when the smart card 93 is inserted into smart card reader 19, the microprocessor 31 will determine if digital images are stored in smart card 93 and, via the display 15, will query the user as to whether any of the stored images are to be used as part of the personalized postage stamp 2. If the answer is yes, that image is used. Otherwise, the vending machine 1 will take a new photo as discussed above. Moreover, in the event that the image taken by camera 13 is very good, it can be downloaded via the computer 1 to the smart card 93 for subsequent use.

Figure 6:
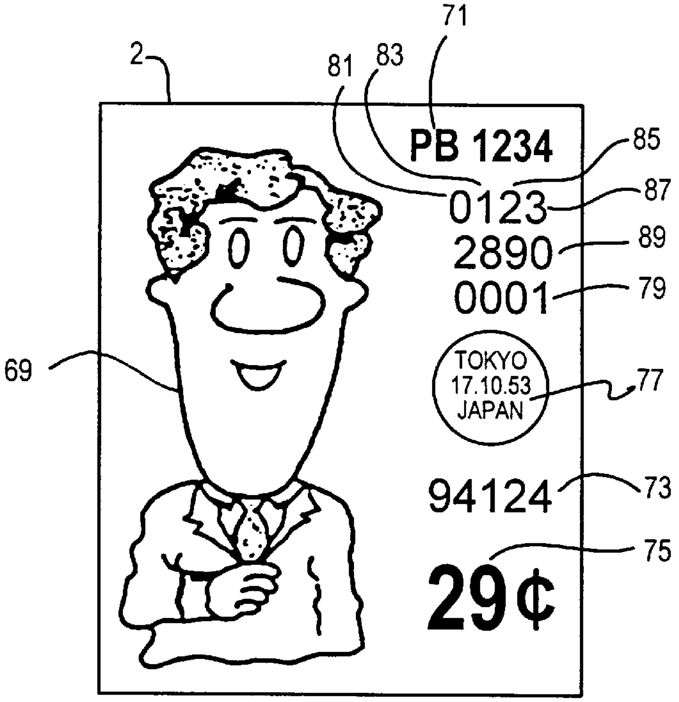
FIG. 6 shows a second postage stamp produced by the inventive vending machine.
Figure 7:
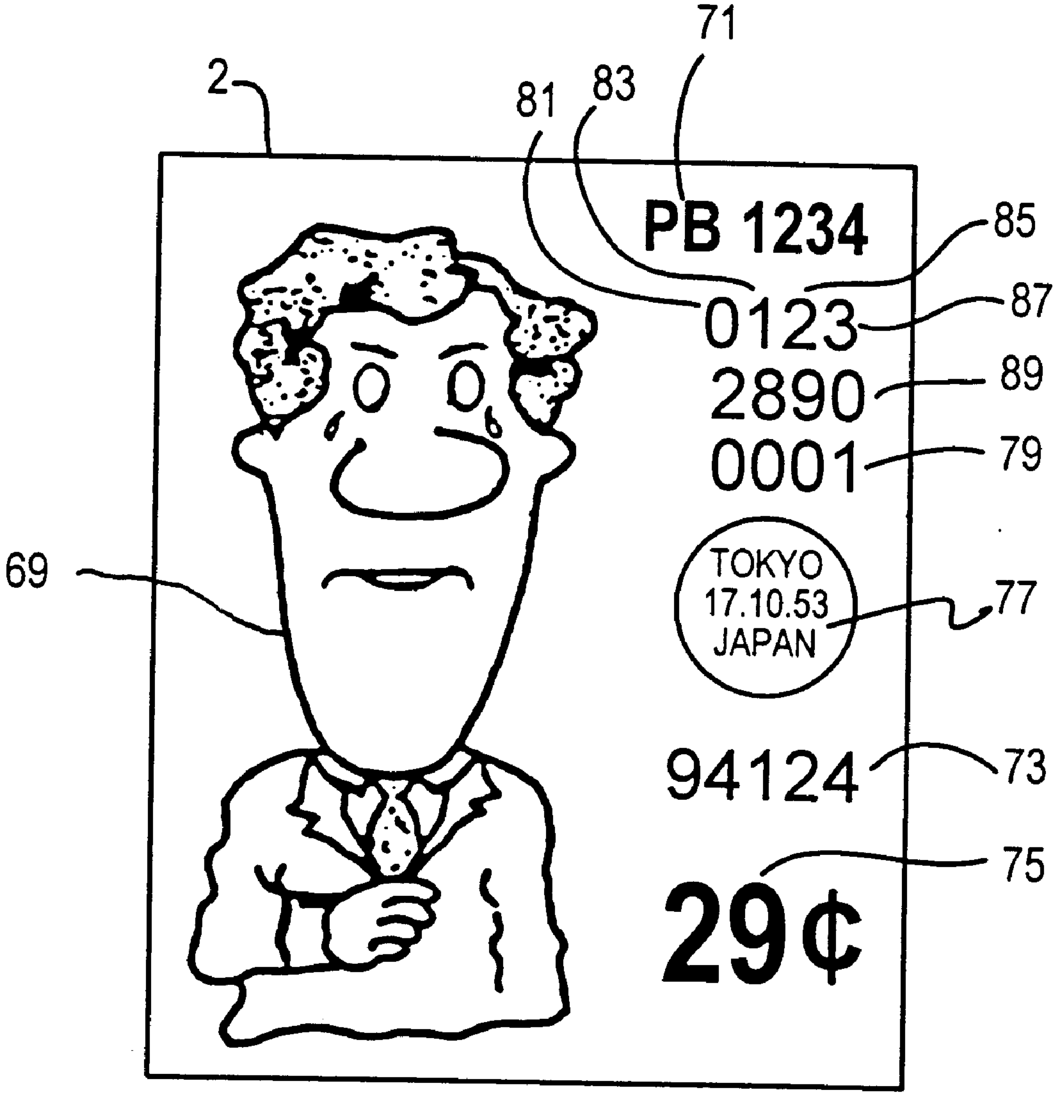
FIG. 7 shows a third postage stamp produced by the inventive vending machine.
Figure 8:
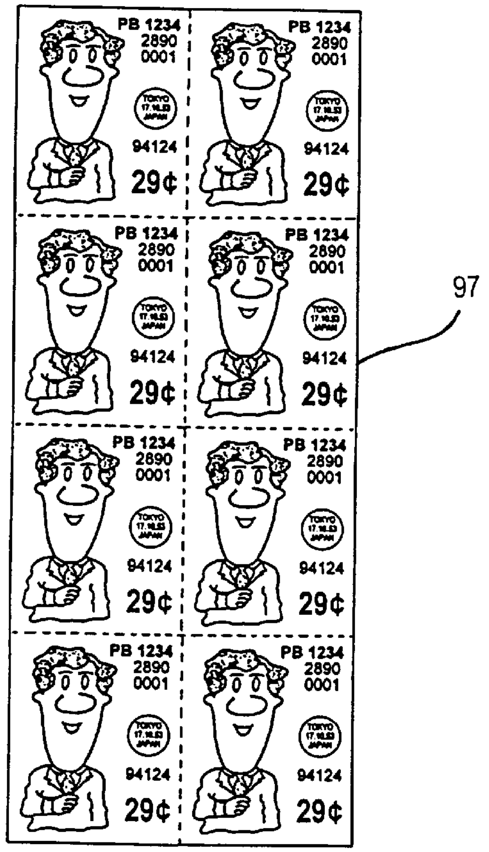
FIG. 8 shows a strip of stamps which are produced by the inventive vending machine.

FIGS. 5, 6, and 7 each show a personalized postage stamp 2 which is produced by vending machine 1. The images are almost identical except that the expression of the individual in each of the personalized stamps 2 is different. In FIG. 5 the individual has a very serious expression while in FIG. 6 the expression is one of happiness. In FIG. 8 the expression is one of sadness. A unique concept of the instant invention is that each image provides a subliminal message to the recipient of the mailpiece as to the nature of the contents of the mailpiece. The expression of FIG. 5 suggests the contents are of a serious nature such as a business related issue whereas the expression of FIG. 6 suggests the contents relate to happy information such as that contained in a birth announcement or wedding invitation. The sad expression of FIG. 7 suggests that the contents include such items as a death notice or even possibly a bill. The key point is that vending machine 1 can print personalized postage stamps 2 which convey a subliminal message to the recipient about the contents of the mailpiece.

Figure 9:
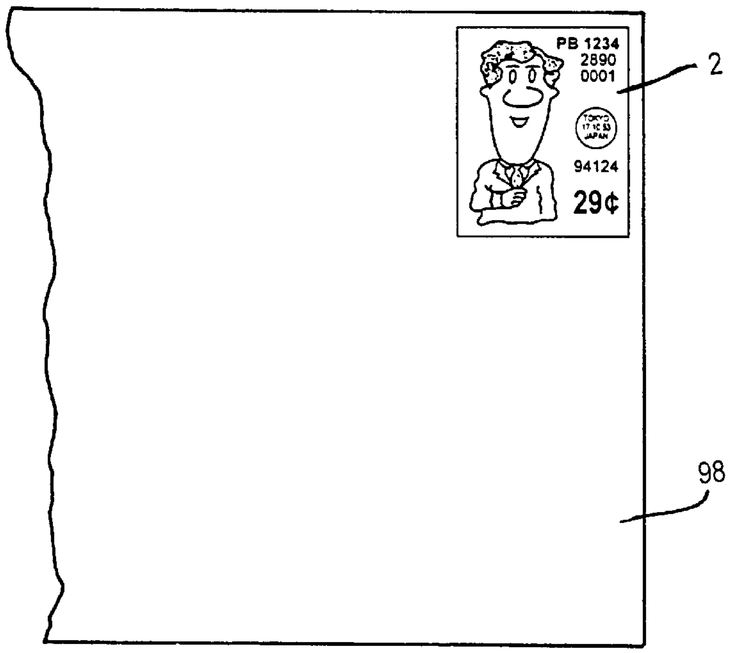
FIG. 9 shows a postage stamp printed directly on an envelope by the inventive vending machine.

FIG. 8 shows a sheet 97 of personalized postage stamps 2 which can be obtained from vending machine 1 when the printing label supply spool 41 is used. Similarly FIG. 9 shows a personalized postage stamp 2 which has been printed directly on an envelope 98.

It is important to note that although the above-described preferred embodiment discusses the use of a combination of digital camera/ink jet printer technology, other known photographic/copier imaging techniques can be used for producing the personalized postage stamp 2 in lieu thereof. For example, conventional camera color photography technology can be used to print a more conventional photograph of the individual with the predetermined postal data superimposed in the photograph. This technology is known such as when cameras print as part of the photograph, the date of the picture taken. Additionally, color type copier imaging technology can also be utilized to produce the personalized postage stamp. Thus, the use of the term "printer" in the claims is broadly defined herein to encompass ink jet printing, conventional photographic imaging and copier imaging techniques. Moreover, while the use of a digital camera is shown, a conventional camera can be used in lieu thereof where standard photographic techniques are used to produce the personalized postage stamp 2.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims.

What is claimed is:

1. A vending machine system for printing postage stamps, the vending machine system comprising:

an enclosed housing having a front panel with an aperture therein;

camera means, mounted in the housing for receiving through the aperture an image of at least one person and for creating an electronic image of the at least one person based on the received image of the at least one person;

a printer;

payment receiving means for accepting payment and for providing a payment signal indicative that payment has been made;

a computer including a memory and program means for 1) causing the camera means to create the electronic image of the at least one person upon receipt of the payment signal, 2) saving the electronic image of the at least one person in the memory, and 3) utilizing the electronic image of the at least one person for controlling the printer to print a first personalized postage stamp on a recording medium, the first personalized postage stamp including predetermined data required by a postal authority and a picture of the at least one person based on the stored electronic image;

a smart card having at least one digital image of at least one person stored therein; and a smart card reader;

wherein at times when the smart card is inserted into the smart card reader the computer interfaces with the smart card reader to obtain the digital image of the at least one person from the smart card and utilizes the digital image of the at least one person in lieu of the electronic image of the at least one person for controlling the printer to print a second personalized postage stamp on the recording medium in lieu of the first personalized postage stamp, the second personalized postage stamp including the predetermined data and a picture of the at least one person based on the digital image.

2. A vending machine as recited in claim 1, wherein the picture of the at least one person based on the digital image includes a predetermined facial expression which provides a message to a recipient about a contents of a mailpiece having the second personalized postage stamp attached thereto.

3. A vending machine system as recited in claim 1, further comprising a display and a keyboard each mounted in the front panel and operatively connected to the computer, and wherein the smart card has stored therein a plurality of different digital images of the at least one person and the memory of the computer has program means stored therein which allow the computer to obtain each of the plurality of different digital images stored in the smart card and to display the plurality of images on the display such that a preferred one of the plurality of digital images is selectable via the keyboard and in response to such selection the computer controls the printer to print a third personalized postage stamp on the recording medium in lieu of the second personalized postage stamp, the third personalized postage stamp including the predetermined data and a picture of the at least one person based on the selected digital image.

4. A vending machine system as recited in claim 1, wherein the smart card has prepaid funds stored therein, the payment receiving means is the smart card reader, and upon insertion of the smart card into the smart card reader the computer determines if the funds in the smart card are sufficient for the desired postage transaction.

5. A vending machine system for printing postage stamps, the vending machine system comprising:

an enclosed housing having a front panel with an aperture therein;

camera means, mounted in the housing for receiving through the aperture an image of at least one person and for creating an electronic image of the at least one person based on the received image of the at least one person;

a printer;

payment receiving means for accepting payment and for providing a payment signal indicative that payment has been made;

a computer including a memory and program means for 1) causing the camera means to create the electronic image of the at least one person upon receipt of the payment signal, 2) saving the electronic image of the at least one person in the memory, and 3) utilizing the electronic image of the at least one person for controlling the printer to print a first personalized postage stamp on a recording medium, the first personalized postage stamp including predetermined data required by a postal authority and a picture of the at least one person based on the stored electronic image; and means for selecting from a plurality of different recording medium the recording medium upon which the first personalized postage stamp is printed;

wherein the plurality of different recording mediums includes labels and a mailpiece;

wherein the selecting means includes a mailpiece slot in the front panel and a switch disposed in the mailpiece slot, and wherein at times when a mailpiece is inserted into the mailpiece slot and contacts the switch the first personalized postage stamp is printed on the mailpiece and at times when no mailpiece is inserted in the mailpiece slot the first personalized postage stamp is printed on the labels.

6. A vending machine system for printing postage stamps, the vending machine system comprising:

an enclosed housing having a front panel with an aperture therein;

camera means, mounted in the housing for receiving through the aperture an image of at least one person and for creating an electronic image of the at least one person based on the received image of the at least one person;

a printer;

payment receiving means for accepting payment and for providing a payment signal indicative that payment has been made;

a computer including a memory and program means for 1) causing the camera means to create the electronic image of the at least one person upon receipt of the payment signal, 2) saving the electronic image of the at least one person in the memory, and 3) utilizing the electronic image of the at least one person for controlling the printer to print a first personalized postage stamp on a recording medium, the first personalized postage stamp including predetermined data required by a postal authority and a picture of the at least one person based on the stored electronic image, and a data center remotely located from the computer and means for establishing communication between the data center and the computer such that the computer transmits to the data center via the communication means data associated with the printing of the first personalized postage stamp by the printer;

wherein the transmitted data includes accounting data and quantity of first personalized postage stamps printed;

wherein the computer transmits the data to the data center on a daily basis and further comprising program means in the memory which disables the vending machine system from printing the first personalized postage stamp in the event that the daily transmission of data does not occur.

* * * * *